July 23, 1957    J. JARRET ET AL    2,800,320
SPRINGS FOR SHOCK ABSORBING PURPOSES
Filed June 23, 1954
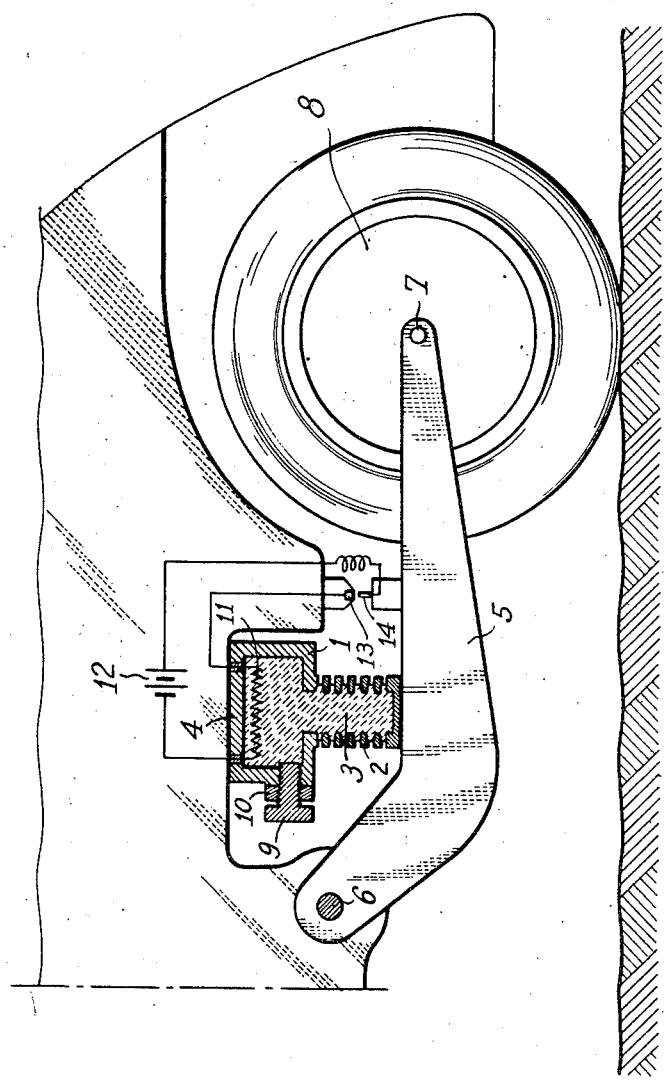

2,800,320

SPRINGS FOR SHOCK ABSORBING PURPOSES

Jean Jarret, Courbevoie, and Jacques Jarret, Lyon, France

Application June 23, 1954, Serial No. 438,708

Claims priority, application France June 25, 1953

4 Claims. (Cl. 267—21)

This invention relates to springs for shock absorbing purposes of the type which has been described in the patent application Serial No. 323,587, filed December 2, 1952, comprising an entirely enclosed casing axially deformable under stress with consequent decrease of internal volume, said casing in an unstressed condition being completely filled with rubber.

The purpose of this invention is to permit for any desired adjustment of the length of such springs so as to allow, for instance, the latter to keep constant whatever the value of the load supported by the springs, that is to say, to make up for the variations of length due to the variations of load; such a purpose is of a particular interest when the springs under consideration are used as suspension springs for vehicles.

According to the invention such a purpose will be met by causing the compressive stress applied to the rubber to vary in the casing.

Such a variation of the compressive stress applied to the rubber may be obtained according to the invention either by modifying the temperature of the rubber by means, for instance, of an electric resistance, or by modifying the sizes of the inner housing of the casing, for instance, by means of a screw extending through a wall of said casing more or less deeply into it.

The invention will now be described with reference to a particular form of embodiment given by way of example and illustrated in the drawing which shows it in the case where it is used for the suspension of a vehicle wheel.

The drawing is a diagrammatical illustration of such suspension means, the spring according to the invention being shown in a sectional view.

In the embodiment illustrated, the spring is constituted by an enclosure which comprises a rigid casing 1 extending into a deformable part 2 the interior of which is filled with a piece of rubber 3.

The spring bears, on the one hand, on a fixed part 4 of the vehicle and, on the other hand, on a movable member 5 pivoted at 6 on the vehicle and carrying the axle 7 of the wheel 8.

In the casing 1, there is engaged a screw 9 which by being driven more or less into it can compress the rubber 3 as it reduces the capacity of the enclosure which contains it. The compression exerted in the part 1 of the casing causes the material to be displaced towards the deformable part 2 and, consequently, the length of the spring to increase.

The screw 9 which is adapted to be locked by a locknut 10 therefore allows for the adjustment of the height of the vehicle with regard to the corresponding movable carriage 5. The adjustment may be effected when the vehicle is empty.

In the casing, there is also provided an electric resistance 11 embedded in the rubber 3. Said resistance 11 is energized by a source of current 12. The resistance 11 and the source 12 are placed in a circuit which comprises a switch the two contacts 13 and 14 of which are fixed to the fixed part of the vehicle and to the movable member 5 respectively. When the vehicle is loaded, it tends to collapse and the switch 13 closes the electric circuit. The electric resistance 11 then heats and transmits a part of the dispersed thermal energy to the rubber 3 the volume of which increases causing the length of the spring 2 to increase. This increase of the length of the spring then makes the vehicle resume its normal height. In this way, a spring is obtained which does not become deformed when the static load to be supported varies.

It should be noted, moreover, that the comparatively important heat capacity of the rubber and its low conductivity ensure the device a certain amount of inertia, so that the dynamic stresses that might be due to the road shocks can deform the spring substantially in the same way as if the heating member were not provided.

It is a well known fact that vehicle suspension means are all the more comfortable as the elastic reaction of the springs is weaker. The reduction of this elastic reaction is generally limited by the necessity of carrying variable loads. This invention has solved this problem by allowing for permanent comfortable suspension means whatever the load to be supported.

In the particular form of embodiment which has been described the desired purpose is to have a spring having a constant length with a variable load. The invention also makes it possible, by causing imperatively the heating circuit to close in order to vary the length of the spring with a constant load by achieving with appropriate motion demultiplying devices a highly powerful jack having a small weight.

A combination of the two actions may also be obtained, that is to say of the variable length with a constant load and the constant length with a variable load. More generally speaking, the invention is not limited to the uses which have been mentioned hereinabove by way of example.

What we claim is:

1. A composite spring comprising, in combination, an entirely enclosed casing having an overall variable length and constituted by a rigid portion and a portion axially deformable under stress with consequent decrease of internal volume, said casing in an unstressed condition being completely filled with rubber, and a screw extending through the wall of the casing into said casing for varying the compressive stress applied to the rubber therein to adjust the length of said spring.

2. A composite spring comprising, in combination, an entirely enclosed casing axially deformable under stress with consequent decrease of internal volume, said casing in an unstressed condition being completely filled with rubber, and a heating member embedded in said rubber for heating same to vary the compressive stress applied to the rubber in said casing.

3. A composite spring as claimed in claim 2, wherein said heating member comprises an electrical resistance connected to a source of electricity by an electrical circuit.

4. Vehicle suspension means comprising, in combination, a composite spring interposed between fixed and movable parts of a vehicle, constituted by an entirely enclosed casing axially deformable under stress with consequent decrease of internal volume, said casing in an unstressed condition being completely filled with rubber, and means for varying the compressive stress exerted on the rubber in said casing when the static load of the vehicle increases comprising a heating electrical resistance embedded in the rubber, said resistance being connected to a source of electricity by an electrical circuit which includes a switch connected between the fixed part and the movable part of the vehicle, the opening and the closing of which being controlled by the displacements of said parts with respect to each other.

References Cited in the file of this patent

UNITED STATES PATENTS

| | | |
|---|---|---|
| 2,643,112 | Smith | June 23, 1953 |
| 2,668,049 | Taylor | Feb. 2, 1954 |

FOREIGN PATENTS

| | | |
|---|---|---|
| 229,015 | Switzerland | Dec. 16, 1943 |
| 428,664 | Great Britain | May 16, 1935 |
| 637,707 | Great Britain | May 24, 1950 |
| 1,066,303 | France | Jan. 20, 1954 |

(Corresponding U. S. Wales 2,729,440, Jan. 3, 1956)